(12) United States Patent
Oguri et al.

(10) Patent No.: US 6,756,126 B2
(45) Date of Patent: Jun. 29, 2004

(54) AIRCRAFT WINDOW OF SYNTHETIC RESIN HAVING HARD COATED FILM AND A METHOD FOR PRODUCING THE SAME

(75) Inventors: Kazuyuki Oguri, Nagoya (JP); Takahiro Sekigawa, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/210,034

(22) Filed: Aug. 2, 2002

(65) Prior Publication Data

US 2003/0049462 A1 Mar. 13, 2003

(30) Foreign Application Priority Data

Aug. 3, 2001 (JP) ........................................ 2001-236180
Mar. 27, 2002 (JP) ........................................ 2002-089359

(51) Int. Cl.[7] .................................................. B32B 9/04
(52) U.S. Cl. ........................ 428/447; 427/387; 427/317
(58) Field of Search .............................. 428/447, 412; 427/387, 377, 317

(56) References Cited

U.S. PATENT DOCUMENTS

| 4,793,108 A | * | 12/1988 | Bain et al. ............... 52/208 |
| 5,674,569 A | * | 10/1997 | Ohsugi et al. ........... 427/407.1 |
| 5,922,411 A | * | 7/1999 | Shimizu et al. .......... 427/397.7 |
| 6,093,451 A | | 7/2000 | Sandlin et al. |
| 6,497,964 B1 | * | 12/2002 | Matsumura et al. ........ 428/447 |

FOREIGN PATENT DOCUMENTS

| EP | 0415716 A1 | 3/1991 |
| EP | 0483087 A1 | 4/1992 |
| EP | 0789050 A2 | 8/1997 |
| EP | 1002824 A1 | 5/2000 |
| WO | 00/20275 | 4/2000 |

* cited by examiner

*Primary Examiner*—David J. Buttner
*Assistant Examiner*—Christopher Keehan
(74) *Attorney, Agent, or Firm*—Wenderoth, Lind & Ponack, L.L.P.

(57) ABSTRACT

An aircraft window of synthetic resin has a hard coated film and either at least a double-pane or single-pane construction, the hard coated film comprises siloxane bonds and/or silazane bonds obtained obtained by coating a coating composition containing perhydropolysilazane or its condensation polymer which is substantially soluble in organic solvent on the surface of the synthetic resin aircraft window and heat-treating at approximately ambient temperature to 100° C. in air or humidified air.

24 Claims, 3 Drawing Sheets

B - B' cross section

AIRCRAFT WINDOW OF SYNTHETIC RESIN HAVING HARD COATED FILM AND A METHOD FOR PRODUCING THE SAME

BACKGROUND OF THE INVENTION

1. Field of the Invention

The present invention relates to an aircraft window of synthetic resin having a hard coated film, such as a cabin window, a cockpit window (mainly a side panel), a canopy or windshield, and a method for producing the same.

2. Description of the Related Art

Synthetic resin such as polycarbonate or polyacrylate resin has been in common usage as aircraft windowpanes in light of the balance of performances such as transparency, strength, specific gravity and durability. Polyacrylate resin has good moldability and easily obtainable optical isotropy in case of producing a large size molding body. Polycarbonate has excellent heat resistance and impact load carrying capacity. These resins have been applied to the windowpane of many kinds of aircrafts, taking advantage of each property above.

Meanwhile, aircraft windowpanes have a lot of occasions to be subject to abrasive damage caused by abrasion with atmospheric ice particles or raindrops, by contact with inorganic particles such as volcanic ash or clouds of sand or by contact with insects sticking to the surface of the windowpanes. The surface is wiped with cleaning cloth or the like when in maintenance and cleaning. Though these resins have no problem with bulk strength, the surface hardness thereof is low so that the surface is apt to become scratched. This is the only difficulty because the aircraft window should have good visibility. A frequent exchange of windowpanes brings about increasing maintenance costs, which is no measure for solving the problem. Hence, recently, an aircraft window mounted with a resin windowpane having a surface protective coating has been desired.

However, conventional methods for applying a protective coating can be roughly categorized by (1) a method for forming a $SiO_2$ film by coating a compound having Si and baking it or by (2) a method for forming a $SiO_2$ film by PVD such as ion-plating. The method (1) gives insufficient hardness of the surface so that the protection goal cannot be attained. The method (2) generates peeling or cracks of the film due to poor adhesion and does not give sufficient protection because of difficulty in obtaining a thick film.

SUMMARY OF THE INVENTION

In view of the need to solve the prior problems, it is the object of the present invention to provide an aircraft window of synthetic resin having a hard coating with excellent hardness and durability in an aircraft cabin window having at least a double-pane construction with a hollow interspace therebetween or an aircraft cockpit, canopy, or windshield window having a single pane construction including a monolayer or multilayer pane and to provide a method for producing the same.

An aircraft window of synthetic resin having hard coated film and at least a double-pane construction with a hollow interspace therebetween for an aircraft cabin window according to the present invention comprises an outer synthetic resin molded body having hard coated film on the outside surface of the aircraft and an inner synthetic resin molded body. The bodies face each other to form at least a double-pane construction with a hollow interspace therebetween. The hard coated film comprises siloxane bonds and/or silazane bonds obtained by coating a coating composition containing perhydropolysilazane or its condensation polymer which is substantially soluble in organic solvent on the surface of the synthetic resin molded body and heat-treating the body at approximately ambient temperature to 100° C. in air or humidified air.

An aircraft cabin window should have a heat-insulating property because of the extreme temperature difference between the inside and the outside of the cabin, transparency, and strength as a member constructing a part of the fuselage and to endure the pressure difference between the inside and the outside of the cabin. Furthermore, a fail-safe structure includes measures in case the pane is damaged. Therefore, the aircraft cabin window has at least a double-pane construction with a hollow interspace between facing transparent synthetic resin molded bodies.

According to the present invention, one side (the outside of the cabin) of at least one of the molded bodies has the hard coated film. At least double-pane construction means that, if needed, a multi-pane construction, beyond double-pane construction, is adopted. This improves the insulating function and the failsafe function. In this case, the hard coat is indispensably needed on the molded body inside of the cabin where abrasion rarely occurs.

Thus, for example, one side of a transparent molded body of synthetic resin such as polycarbonate or cast acrylate resin is coated with a solution of substantially organic-solvent-soluble perhydropolysilazane or its condensation polymer in an organic solvent so that the film thickness after heat-treating codes to be from 1 $\mu$m to 100 $\mu$m and the coated body is heat-treated at approximately ambient temperature to 100° C. after drying in air. A hard film having silazane bonds and/or siloxane bonds is coated on the one side of thus obtained transparent molded body of synthetic resin such as polycarbonate or cast acrylate resin. A window part comprises the two bodies bonded together with a spacer inserted at the outer perimeter therebetween. The faces having no hard coating of the two bodies are facing each other so as to be spaced apart from one another. The window part is fixed to an opening of the fuselage for a window through a gasket or a sealing member to form a cabin window. In this case, a gasket or a sealing member may be molded so that the two bodies are spaced apart from one another when the two bodies are fixed through the gasket or the sealing member and a two-pane construction is formed by fixing one, body by one body to the gasket or the sealing member.

The cast acrylate resin is a transparent synthetic resin having a high softening point consisting of a homopolymer or a copolymer obtained by polymerizing a polymerizable monomer consisting mainly of methyl methacrylate. The synthetic resin is cast to a panel-formed molded body by heating to flow to a temperature equal to or higher than the softening point thereof. A windowpane can be made from the panel-formed molded body by cutting to a form of the windowpane. A windowpane can also be made by casting the resin to a form of the windowpane. A method other than these is to pour the monomer into a board-formed mold to cast and polymerize at the same time.

The thickness of the transparent molded body of synthetic resin is variable according to the intended strength of the fuselage or the size of the opening of the fuselage. The spacer may be made from the same material as the transparent molded body of synthetic resin or from more elastic material than that of the body. The gasket or the sealing member is selected from organic materials having appropriate elasticity, strength and durability in order to keep the cabin airtight from the outside, where the temperature difference is great, and to firmly support the windowpanes.

One of the perhydropolysilazane or its condensation polymer which is substantially soluble in organic solvent in the coating composition is a cyclic or linear perhydropolysilazane having a structure of the formula (1) as a repeated unit or a mixture thereof.

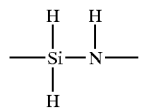
(1)

Further, another of the perhydropolysilazane or its condensation polymer is an intermolecular dehydrogenation condensation polymer of cyclic or linear perhydropolysilazanes having a structure of the formula (1) as a repeated unit or a mixture of them.

Furthermore, another of the perhydropolysilazane or its condensation polymer is a dehydrogenation condensation polymer having a plurality of the condensation structures of (2) or (3) by condensing the cyclic or linear perhydropolysilazane having a structure of (1) with ammonia or hydrazine or condensing the mixture of the cyclic and linear perhydropolysilazane having a structure of (1) with ammonia or hydrazine.

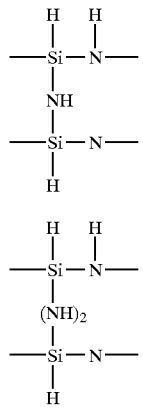
(2)

(3)

A hard coated film having siloxane bonds and/or silazane bonds according to the present invention has the bonds formed by coating the silazane compound and heat-treating, the silazane bond being indicated by the formula (4) and the siloxane bond being indicated by the formula (5).

—Si—N— (4)

—Si—O— (5)

According to the present invention, an aircraft window of synthetic resin having hard coated film and a single pane construction including a mono-layer or multi-layer pane for an aircraft cockpit, canopy, or windshield window comprises a synthetic resin molded body having hard coated film on the outside surface or both outside and inside of the aircraft to form a single pane construction of mono-layer or multi-layer. The hard coated film comprises siloxane bonds and/or silazane bonds obtained by coating a coating composition containing perhydropolysilazane or its condensation polymer which is substantially soluble in organic solvent on the surface of the synthetic resin molded body and heat-treating the body at approximately ambient temperature to 100° C. in air or humidified air.

An aircraft cockpit, canopy, or windshield window is exposed to more severe conditions than a cabin window is exposed to. Collision chances with foreign matter are more frequent and the impact is higher. The windowpane is not only a plane surface but also a curved surface. There is another requirement of clear visibility so that irregular refraction of penetrated light is not allowed. Thus, the windowpane cannot be a double-pane construction as a cabin window.

Accordingly, a multi-layer laminated structure is necessary in order to attain sufficient failsafe function for single pane construction even if it has a curved surface. High strength resin such as stretched polyacrylate resin is used for a main structural part. Stretching strengthens the resin because the molecular arrangement turns regular thereby. The tensile strength, compression strength and other strength of the resin are far higher than those of cast polyacrylate resin, and moldability and transparency remain. Material sandwiched between the stretched polyacrylate resins is selected from high adherence resins which absorb the thermal expansion or shrinkage stress by the temperature difference between outside and inside of the fuselage and do not affect the other layer when the one layer gets cracked, though the material is not restricted. An electrically conductive film heated by electric current may be sandwiched in order to prevent bedewing, icing or hazing in addition to the aforementioned structural function.

The windowpane having a multi-layer laminated structure has a hard coated film on the inside surface of the fuselage or hard coated films on the both inside and outside surfaces, because the inside surface is also apt to get scratched, which is different from the cabin window. A single-layer windowpane also has both cases stated above for the same reason.

According to the present invention, a synthetic resin molded body of the aircraft window of synthetic resin having hard coated film comprises a polyacrylate resin molded body or a polycarbonate resin molded body. The polyacrylate resin preferably comprises a cast polyacrylate resin or a stretched polyacrylate resin.

Various kinds of heretofore known perhydropolysilazanes or their condensation polymers can be used as perhydropolysilazane or its condensation polymer, which is substantially soluble in organic solvent, according to the present invention. For example one of the above compounds is a cyclic or linear perhydropolysilazane having a structure of the formula (1) as a repeated unit or a mixture thereof, which can be produced by a method disclosed in Japanese laid open publication P1984-207812A.

Another example of perhydropolysilazane or its condensation polymer, which is substantially soluble in organic solvent is a compound obtained by heating to dehydrocondense a cyclic or linear perhydropolysilazane having a structure of the formula (1) or a mixture thereof in an alkaline solvent or in a solvent containing an alkaline compound. An example of the methods for producing the compound is disclosed in Japanese laid open publication P1989-138108A.

Another example of perhydropolysilazane or its condensation polymer, which is substantially soluble in organic solvent, is a compound obtained by heating to dehydrocondense a cyclic or linear perhydropolysilazane having a structure of the formula (1) or a mixture thereof through ammonia or hydrazine. An example of the methods for producing the compound is disclosed in Japanese laid open publication P1989-138107A.

The molecular weight of perhydropolysilazane or its condensation polymer is not particularly restricted but preferably as high as it gives a good film and not as high as it gives appropriate workability by being substantially soluble in an organic solvent for coating and having enough liquidity.

The hydrogen elements are preferably not consumed completely, but remain partially unreacted, which is related to the adherence of the hardened film, whereby a strongly adhered hardened film can be formed on the synthetic resin surface.

A solvent for coating perhydropolysilazane or its condensation polymer on the surface of the sythetic resin is preferably a solvent which is not reactive with SiH group. Compounds which have active hydrogen atoms such as alcohol, primary amine, secondary amine or water containing solvent should be avoided. Thus an appropriate solvent is, for example, aliphatic, alicyclic or aromatic hydrocarbon, halogenated hydrocarbon, and aliphatic or alicyclic ether. Further, a mixture of more than two kinds of solvents can be used for adjusting the solubility of the synthetic resin to the solvent or the evaporation rate of the solvent. But a solvent that dissolves the synthetic resin well is inappropriate. Some kinds of aromatic hydrocarbon, ketone or ester fall into this category. Therefore, an appropriate compound should be selected as a solvent, or a non-solvent of these resins is mixed to adjust the solubility.

A coating composition containing a substantially organic solvent soluble perhydropolysilazane or its condensation polymer used in the present invention is a known composition which is made and sold by Clariant Japan K.K. It is sold as a product name of polysilazane silica coating L110, L710, N110, V110, D110 and L120. These are 20% xylene or dibutylether solution of perhydropolysilazane having an average number average molecular weight of 700–1000 with or without an added oxidation condensation catalyst. Each product is named according to the kind of solvent, molecular weight, and the kind of catalyst including with or without catalyst.

Coating on the surface of the molded resin body is performed by known methods such as dipping, spraying, brush coating, spin coating, roll coating or doctor-blade coating. After coating, solvent is evaporated at low temperature and the coated resin body is heat-treated at prescribed temperature. The heat-treating environment can be chosen from among humidified air, dry air, humidified inert gas and dry inert gas. The higher the partial pressure of water or oxygen is, the more rapidly the film is formed at low temperature, since the rate of reaction at low temperature becomes more rapid. Further, if a coating composition containing an oxidation condensation catalyst is used, it is possible to form more rapidly a coating film at lower temperature.

Further, according to the present invention, an aircraft window of synthetic resin having hard coated film comprises a monolayer hard coated film whose thickness is 1 $\mu$m or more and less than 10 $\mu$m after coating the coating composition on the surface of the molded resin body and heat-treating in air or humidified air.

In a conventional hard coating, a protective coating is formed by coating a coating composition containing a compound of silicon to which alkoxy groups are bonded, generating siloxane bonds through the steps of hydrolysis and dealcoholization or dehydration. Unlike with a film forming mechanism of the present invention, as bulky, high molecular alkoxy groups are broken away, causing decrease of molecular weight of the polymer resulting from the film forming reaction, the film has low density and poor adherence. Alkoxy groups often remain depending on a reaction condition, giving a film of low density and poor adherence. Therefore, a film thickness formed by this kind of reaction has its limits of 1 $\mu$m at most. A film of more than 1 $\mu$m results in generation of cracks or deterioration of adherence by heat cycle to become far from practical use. Such thin film coated on an aircraft window has poor durability so that a condition of cleaning work becomes severe because the work of taking off the dirt on the outside of the fuselage needs to be frequent.

When a hard coated film having siloxane bonds and/or silazane bonds is formed by coating a coating composition containing perhydropolysilazane or its condensation polymer which is substantially soluble in organic solvent on the surface of the molded synthetic resin body and heat-treating the body at approximately ambient temperature to 100° C. in air or humidified air according to the present invention, the film forming mechanism contains conversion to siloxane bonding through hydrolysis, oxidation, deammonization and dehydration. The molecular weight of the resultant film polymer is essentially larger than that of perhydropolysilazane and there is no large organic group eliminating from perhydropolysilazane so as to give a very dense and adherent film. Therefore, the film thickness of 1 $\mu$m or more enables one to obtain the hardness to attain the object of the present invention. The object is to obtain a coated film having high durability, enough hardness to bear abrasion, and good adherence, including improvement of conditions in cleaning an aircraft window.

However, durability in the thermal cycle test begins to lower with the mono-layer film when the film thickness comes to 10 $\mu$m or more, causing cracks and peeling off of the film to happen.

According to the present invention, a hard coated film of an aircraft window of synthetic resin comprises substantially two layers of an intermediate layer which coats the top surface of molded resin body and an outermost layer which coats the top surface of the intermediate layer. After the molded resin body is coated with the coating composition and heat-treated in air or in humidified air, a coated film thickness of two layers in total is 10 $\mu$m or more and 200$\mu$m or less.

Thus, a very thick-coated film can be formed when the resin surface is coated with two layers according to the present invention. The coated film of an aircraft window is exposed to very severe conditions, as is well known, and should endure a broad range of temperature conditions of 80° C. under direct rays of the sun in a tropical zone or under friction heat of high speed flying to −50° C. under high-altitude or high-latitude flying. If an aircraft flies at supersonic speed, the coated film of the aircraft window should endure a broader temperature range of −70 to 120° C. If the harder film is coated to ensure abrasion resistance, thermal or other stress of expansion-shrinkage cycles due to a difference of thermal expansion between the film and substrates such as polyacrylate resin or polycarbonate resin causes cracks. Thus if the film thickness is secured by one layer, a thickness of 10 $\mu$m is the limit because of the above reason.

Hence, the present inventors tried a surface treatment comprising steps of coating perhydropolysilazane free from catalyst, a composition of the kind which does not harden at low temperature such as N510 or N310 and of heat-treating at 80–100° C. When coating perhydropolysilazane free from catalyst, silazane is not perfectly converted to siloxane, but partially remains by the heat-treatment such extent so as to form a soft and flexible coated film of an intermediate layer. When perhydropolysilazane containing catalyst is coated on the top of an undercoating layer (intermediate layer) and heated to prescribed hardness, and even the thickness of the coated film comes to 200 $\mu$m ih total, the intermediate layer absorbs stress in the undercoating layer so that cracks or peeling-off do not occur, even after the heat cycle. Such double layer coating enables a hard protective coated film of sufficient thickness.

Since silazane bonding remains in the undercoating layer, it is apprehended that a property of the film may change with time by reacting with water in the air. It would appear that the outermost layer coating functions as a barrier coating so as to block off water or oxygen. Consequently, the double layer coating has good durability.

A practical application of the hard coated film is impossible without double coating, including the undercoating layer according to the present invention, in the case of a canopy or a windshield for which a thick hard coating is necessary. Double coating is not indispensable for a coating for a cabin window of a passenger carrier as thin film thickness can be applicable.

According to the present invention, a hard coated film thickness of the intermediate layer in an aircraft window of synthetic resin having hard coated film is between 1 $\mu$m and 50 $\mu$m. The undercoating layer having a thickness of less than 1 $\mu$m is not effective as an intermediate layer; the undercoating layer having a thickness of more than 50 $\mu$m negatively affects the strength of the coated film in total because the intermediate layer is comparatively soft.

According to the present invention, in an aircraft window of synthetic resin having a hard coated film, the coating composition for a monolayer coated film or the coating composition for the outermost layer of a double-layer coated film contains paradium catalyst. A large oven for high temperatures is necessary in order to heat-treat a large molded body such as an aircraft window of synthetic resin. Thus, it is advantageous to react at low temperature at high reaction rate by an effective catalyst such as paradium. The coated film may also be hardened in an atmosphere of a vapor of an alkaline compound having no reactive hydrogen such as trialkylamine as a catalytic measure for accelerating the reaction.

BRIEF DESCRIPTION OF DRAWINGS

In the accompanying drawings:

FIG. 3 (B) is a cross sectional view along line C—C' of FIG. 3 (A).

DETAILED DESCRIPTION OF PREFERRED EMBODIMENTS

Figure 1:
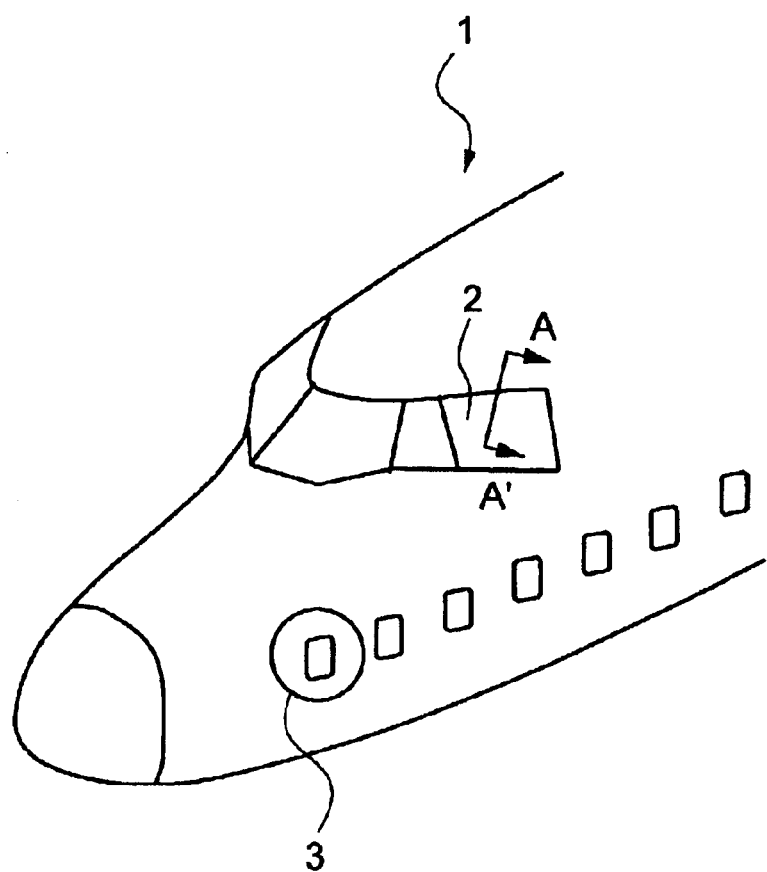
FIG. 1 is a schematic drawing showing an aircraft window.

The invention will now be described below in detail by way of example with reference to the accompanying drawings. It should be understood, however, that the description herein of specific embodiments such as to the dimensions, the kinds of material, the configurations and the relative disposition of the elemental parts and the like is not intended to limit the invention to the particular forms disclosed, but the intention is to disclose for the sake of example unless otherwise specifically described.

Example 1

Polysilazane coating compositions capable of hardening at low temperature contain an organic amine catalyst or a paradium catalyst. A commercially available polysilazane coating composition for polyacrylate resin, L110 is a 20% xylene solution containing a paradium catalyst and that for polycarbonate resin, L120 is a 20% dibutylether solution containing a paradium catalyst. L110 and L120 are produced and sold by Clariant Japan K.K. Hard coated film was formed on a cast polyacrylate resin panel or a polycarbonate resin panel using L110 or L120 as test solutions as follows.

A test solution was coated on an above mentioned test panel so that a dry film thickness after treatment came to between 1 $\mu$m and 10 $\mu$m by setting an appropriate thickness of the solution film by means of such as spray coating, dip coating or spin coating.

A coated test panel was dried in the air and heat-treated for an hour in the atmosphere of air having a relative humidity of 70% and a temperature of 80° C. An obtained coated film on the synthetic resins had a thickness of approximately 5 $\mu$m and was uniform, colorless and transparent with no generation of cracks or deterioration.

Polysilazane solution was so volatile that the solvent vaporized rapidly and it was difficult to adjust accurately the thickness of solution. In this case, after coating by means such as spray coating, dip coating or spin coating and heat-treating, the coated film was ground to a film thickness of 1 $\mu$m or more and 10 $\mu$m or less.

As for a comparative example 1, $SiO_2$ film having a thickness of approximately 5 $\mu$m was coated on a polyacrylate panel and a polycarbonate panel by means of an ion plating method. A uniform, colorless and transparent film was formed. These test panels were tested as follows.

Adherence: a gridiron was cut at a distance and depth of 1 mm on the film of 1 $cm^2$. A piece of cellophane tape was affixed over the gridiron and then peeled off at an angle of 90 degrees and at a rate of 30 cm/sec. Remaining boxes were counted.

Hardness: a line was drawn on the surface of a film with a pencil loaded by 100 gr weight. A pencil hardness which caused scratches was recorded.

Abrasive resistance: the surface of a film was abraded using steel wool #000 at a weight of 250 g and a rotational rate of 60 rpm. After 1000 times rotation, the haze value was recorded. (Haze value is a measure indicating the scattering extent of light. The smaller the value is, the more transparent the material is.) The result is shown in table 1.

TABLE 1

| Test Piece | Adherence | Hardness | Haze value |
| --- | --- | --- | --- |
| Polyacrylate panel coated with L110 | 100/100 | 8H | 3% |
| Polycarbonate panel coated with L120 | 100/100 | 9H | 2.5% |
| Polyacrylate panel with $SiO_2$ film by ion plating | 60/100 | 8H | 10% |
| Polycarbonate panel with $SiO_2$ film by ion plating | 80/100 | >9H | 8% |
| Polyacrylate panel uncoated | — | HB | 15% |
| Polycarbonate panel uncoated | — | H | 10% |

As shown in table 1, the surface hardness of the polyacrylate and polycarbonate coated by ion plating method is the same or greater than that coated by polysilazane coat and bake method. As apparent shown by a result of the tape test, the haze value at abrasion test increased by generating cracks and peelings on account of lack of adherence.

Example 2

With regard to evaluation of abrasion resistance, a coated film of the present invention was compared with a conventional coated film with Taber Abraser described in ASTM Standard. A hard coating used for protecting polyacrylate aircraft window in a certain country, a conventional hard coating in Japan and a hard coating according to the present invention were compared under the same condition. The coated substrate was polyacrylate resin.

The test method was based on ASTM Standard D1044. Three test specimens having a diameter of 102 mm and a thickness of 12.7 mm were prepared for each test. The test specimens were conditioned and tested with Taber Abraser under the surrounding conditions described in the Standard. The abraser was attached with an abrasive wheel of CS-10F and test was done at a rotational rate of 100 rpm with a weight of 500 gf. The light scattered by abraded tracks of the specimen was measured by a photometer pursuant to ASTM1003. An average value of data of percentage scattered light with regard to three specimens was shown in Table 2.

TABLE 2

|  | Acrylate Substrate | Coating used in certain country | Conventional Coating used in Japan | Coating according to the present invention |
|---|---|---|---|---|
| Haze value before test | 1.15 | 1.15 | 0.75 | 0.73 |
| Haze value after test | 25.20 | 3.38 | 2.40 | 1.05 |
| Haze value variation | 24.05 | 2.23 | 1.65 | 0.32 |

Compared with a hard coated film for an aircraft window used in certain country, the hard coated film according to the present invention was found to have an abrasion durability seven times as great.

Example 3

The effect of heat-treating in moistened air was tested as follows. Test specimens coated with L110 were prepared likewise in example 1, heat-treated under the two levels of conditions shown in table 3 and tested pursuant to the ASTM. A rotational rate of Taber Abraser was 500 rpm, 5 times as fast as that in example 2. Other conditions are the same as in example 2. The result was shown in table 3.

TABLE 3

| Heat-treating condition | Ambient Humidity, 80° C., 5 hours | 98% RH, 80° C., 5 hours |
|---|---|---|
| Haze value before test | 1.15 | 1.03 |
| Haze value after test | 5.55 | 2.18 |
| Haze value variation | 4.40 | 1.15 |

As shown in table 3, by heat-treating in humidified air of 98% RH, the abrasion durability (the reciprocal of the variation of haze value) was improved by approximately 4 times even at the same heat-treating temperature.

Example 4

A double layer coating according to the present invention was tested as follows.

A test specimen with a single coated film of a thickness of 50 μm which was prepared by coating L110 (20% xylene solution of perhydropolysilazan having a molecular weight of L1000 containing paradium catalyst) directly on a polyacrylate test panel and heat-treating at 80° C. was compared with a test specimen with a double coated film which was prepared by coating N510 (20% xylene solution of perhydropolysilazan having a molecular weight of 1200 containing no catalyst) on a polyacrylate test panel as an undercoating and heat-treating at 80° C. to form a film of 20 μm as an intermediate layer and coating L110 on the top of the intermediate layer and heat-treating to form a film of 110 μm as a top layer.

By a test of heating to 80° C. in the atmosphere and cooling to −20° C., no crack was generated with two kinds of specimens. Then, a test of a most severe temperature change was performed in such a manner that a specimen heated to 80° C. was dipped into the ice water of 0° C. As a result, though many fine cracks were generated by the rapid cooling on a specimen of acrylate coated with monolayer of L110, no crack was generated on the double-coated specimen.

Example 5

Figure 2:
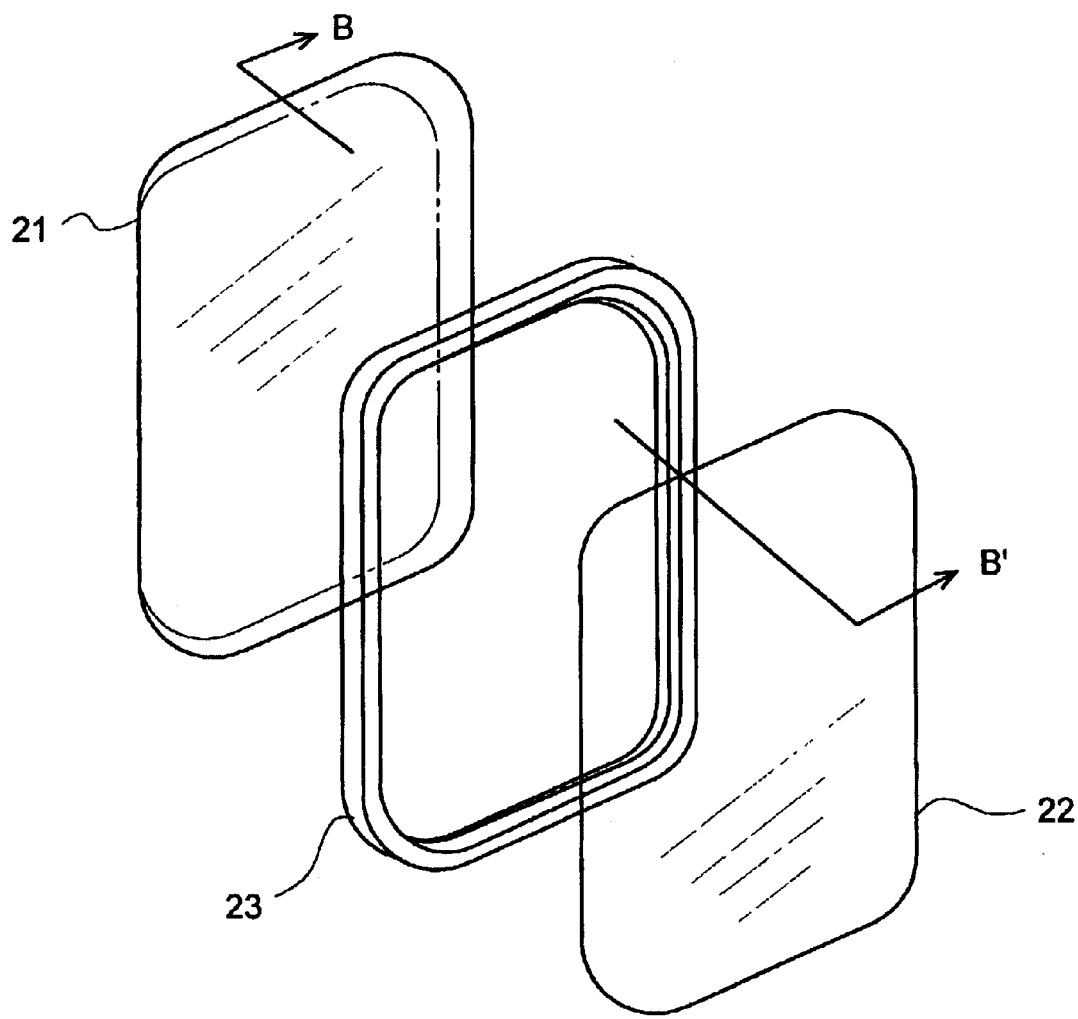
FIG. 2 is a perspective view of a cabin window and a cross sectional view along line B—B'.
Figure 2:
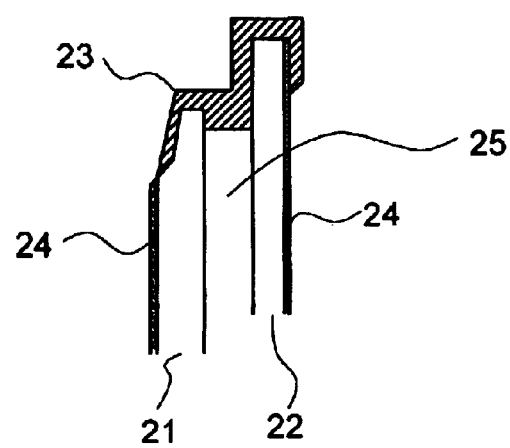

FIG. 1 is a schematic drawing showing an aircraft window. In FIG. 1, 2 is a cockpit window. Inorganic glass is often used in front windows; polyacrylate resin is often used inside windows. 3 is a cabin window provided on a fuselage 1. FIG. 2 is a perspective view and a cross sectional view of the cabin window.

In FIG. 2, 21 is a pane outside of the fuselage of cast polyacrylate resin molded body cut out as shown in the drawing and having a hard coated film 24 according to the present invention. A cast polyacrylate resin board having a thickness of 15 mm was cut out to a pane with a round shown in the drawing and the edge part was chamfered. Silazane coating composition L110 of the example 1 was spray-coated to a hardened thickness of 5 μm on one side of the pane and solvent was air-dried at an ambient temperature. After that, the coated pane was heat-treated in the air of a temperature of 70° C. and a relative humidity of 60% for two hours.

22 is an inside pane of the fuselage of a cast polyacrylate resin molded body, cut out as shown in the drawing.

A cabin window is constructed in such a manner that a pane outside of the fuselage having a hard coated film on the one side 21 and a inside pane of the fuselage having no hard coated film 22 were embedded into a neoprene gasket 23 through a hollow interspace 25 with faces having no coated film thereon facing each other.

Example 6

Figure 3A:
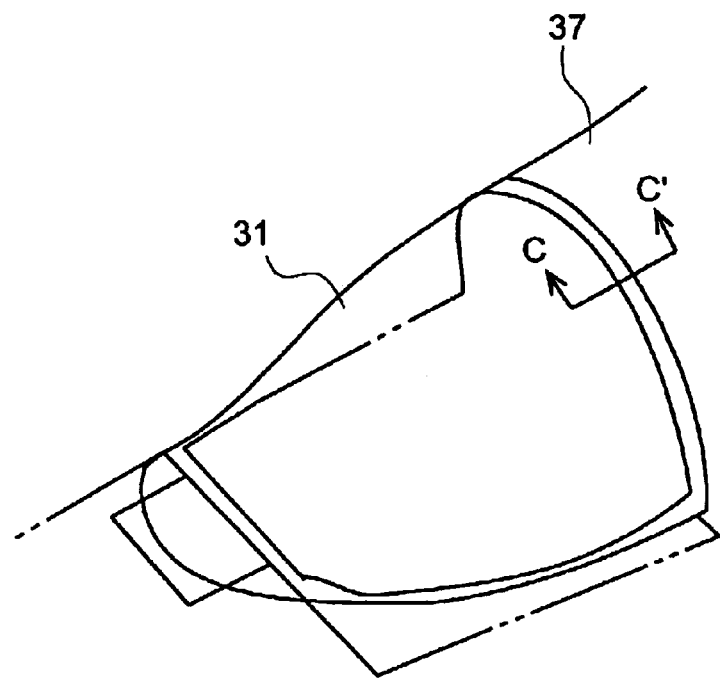
FIG. 3 (A) is a perspective view of a wind shield and canopy of a small aircraft.
Figure 3B:
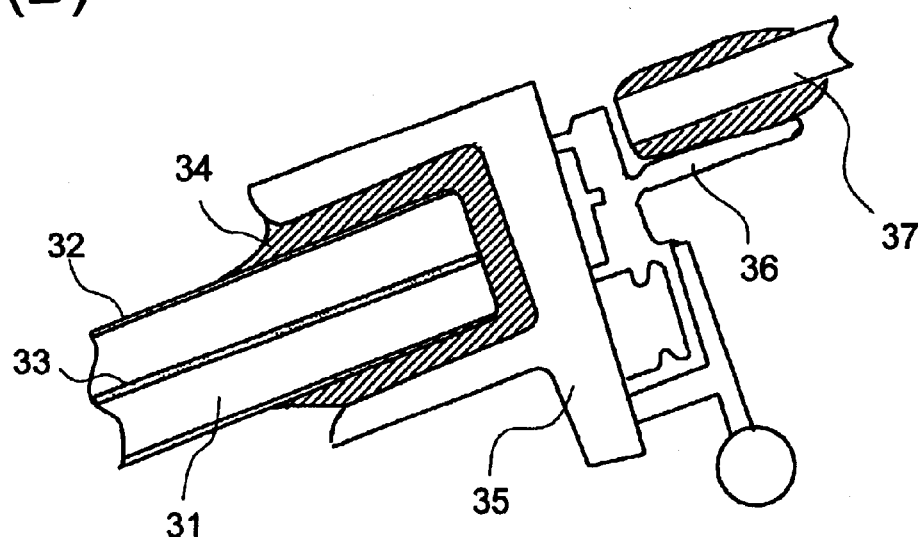

FIG. 3 (A) is a perspective view of a windshield and canopy of a small aircraft and FIG. 3 (B) is a cross sectional view along C—C' line of FIG. 3 (A). In FIG. 3 (A), 31 is a stretched polyacrylate resin wind shield and 37 is a stretched polyacrylate resin canopy.

36 is a canopy frame and 35 is a windshield frame. A laminated pane was made by sandwiching butyral resin 33 between stretched polyacrylate resin molded bodies 31, 31 with a thickness of 20 mm. Silazane coating composition L110 of the example 1 was spray-coated to a hardened thickness of 10 μm on both sides of the pane and solvent was air-dried at an ambient temperature. After that, the coated pane was heat-treated in the air of a temperature of 70° C. and a relative humidity of 60% for three hours.

Thus, the windowpane having a hard coated film according to the present invention was fixed to the windshield frame 35 with sealant 34.

EFFECT OF THE INVENTION

The present invention can provide an aircraft window of synthetic resin having a hard coating with excellent hardness and durability in an aircraft cabin window having at least a double-pane construction with a hollow interspace therebetween or a aircraft cockpit, canopy, or windshield window having a single pane construction including a monolayer or multilayer pane and also provide a method for producing the same.

What is claimed is:

1. An aircraft cabin window of synthetic resin having a hard coated film, comprising:
    an outer synthetic resin molded body having an aircraft outside surface and a hard coated film on the aircraft outside surface;
    an inner synthetic resin molded body;
    wherein said outer synthetic resin molded body and said inner synthetic resin molded body face each other so as to form a double-pane construction with a hollow interspace there between;
    wherein said hard coated film comprises siloxane bonds and/or silazane bonds obtained by coating a coating composition containing inorganic perhydropolysilazane or its intermolecular dehydrogenation condensation polymer, which is substantially soluble in organic solvent that has no reactivity with SiH group or SiN group, on a surface of said outer synthetic resin molded body and heat-treating said outer synthetic resin body at approximately ambient temperature to 100° C. in air or humidified air.

2. The aircraft window of claim 1, wherein:
    in the coating composition, hydrogen atoms bonded to the silicon atoms of perhydropolysilazane or its intermolecular dehydrogenation condensation polymer are not completely consumed by condensation reaction, remaining unreacted; and
    said hard coated film is one layer having a thickness of 1 μm or more and below 10 μm.

3. The aircraft window of claim 2, wherein the coating composition contains a paradium catalyst.

4. The aircraft window of claim 1, wherein:
    in the coating composition, hydrogen atoms bonded to the silicon atoms of perhydropolysilazane or its intermolecular dehydrogenation condensation polymer are not completely consumed by condensation reaction, remaining unreacted;
    said hard coated film comprises substantially two layers including an intermediate layer coating a top surface of said resin molded body and an outermost layer coating a top surface of said intermediate layer; and
    said hard coated film has a thickness of 10 μm or more and below 200 μm.

5. The aircraft window of claim 4, wherein said intermediate layer of said hard coated film has a thickness of 1 μm or more and below 50 μm.

6. The aircraft window of claim 4, wherein the coating composition forms said outermost layer and contains paradium catalyst.

7. An aircraft cockpit, canopy or windshield window of synthetic resin having a hard coated film, comprising a synthetic resin molded body having an aircraft outside surface and an aircraft inside surface and a hard coated film on at least the aircraft outside surface so as to form a single pane construction on a mono-layer or a multi-layer, wherein said hard coated film comprises siloxane bonds and/or silazane bonds obtained by coating a coating composition containing inorganic perhydropolysilazane or its intermolecular dehydrogenation condensation polymer, which is substantially soluble in organic solvent having no reactivity with SiH group or SiN group, on the surface of said synthetic resin molded body and heat-treating said synthetic resin molded body at approximately ambient temperature to 100° C. in air or humidified air.

8. The aircraft window of claim 7, wherein said hard coated film has a thickness of 1 μm or more and below 100 μm.

9. The aircraft window of claim 8, wherein the coating composition contains paradium catalyst.

10. The aircraft window of claim 7, wherein said hard coated film comprises substantially two layers including an intermediate layer coating a top surface of said resin molded body and an outermost layer coating a top surface of said intermediate having a total film thickness of between 10 μm and 200 μm.

11. The aircraft window of claim 10, wherein said intermediate layer has a thickness of 1 μm or more and below 50 μm.

12. The aircraft window of claim 10, wherein the coating composition contains paradium catalyst.

13. A method for producing an aircraft cabin window of synthetic resin having a hard coated film, comprising:
    coating a coating composition containing inorganic perhydropolysilazane or its intermolecular dehydrogenation condensation polymer, which is substantially soluble in organic solvent that has no reactivity with SiH group or SiN group, on the surface of a synthetic resin molded body;
    heat treating the synthetic resin molded body at approximately ambient temperature to 100° C. in air or humidified air to obtain a hard coated film having siloxane bands and/or silazane bonds;
    facing the surface of the synthetic resin molded body having the hard coated film thereon outward as an outside surface of the aircraft and facing another surface of the synthetic resin molded body having no hard coated film toward a surface of an inner synthetic resin molded body having no hard coated film; and
    forming an at least double-pane construction including the synthetic resin molded body and the inner synthetic resin molded body with a hollow interspace there between.

14. The method of claim 13, wherein, in the coating composition, hydrogen atoms bonded to silicon atoms of perhydropolysilazane or its intermolecular dehydrogenation polymer are not completely consumed by condensation reaction, remaining unreacted, and the hard coated film obtained by said coating and said heat treating is one layer and has a thickness of 1 μm or more and below 10 μm.

15. The method of claim 13, wherein, in the coating composition, hydrogen atoms bonded to silicon atoms of perhydropolysilazane or its intermolecular dehydrogenation polymer are not completely consumed by condensation reaction, remaining unreacted, and the hard coated film obtained by said coating and said heat treating comprises substantially two layers including an intermediate layer coating a top surface of the synthetic resin molded body and an outermost layer coating a top surface of the intermediate layer forming a total thickness between 10 μm and 200 μm.

16. The method of claim 15, wherein a coated film thickness of the intermediate layer is between 1 μm and 50 μm.

17. A method for producing an aircraft cockpit, canopy or windshield window of synthetic resin having a hard coated film, comprising:

coating a coating composition containing inorganic perhydropolysilazane or its intermolecular dehydrogenation condensation polymer, which is substantially soluble in organic solvent that has no reactivity with SiH group or SiN group, on the surface of a mono-layer or multi-layer synthetic resin molded body;

heat treating the synthetic resin molded body at approximately ambient temperature to 100° C. in air or humidified air to obtain a hard coated film with no large organic group to be eliminated therefrom and having siloxane bonds and/or silazane bonds; and disposing the coated mono-layer or multi-layer synthetic resin molded body so that the hard coated film faces outward as an outside surface of the aircraft and forms a single-pane construction including a mono-layer or multi-layer pane.

18. The aircraft window of claim 17, wherein the hard coated film obtained by said coating and said heat treating has a thickness of 1 μm or more and below 10 μm.

19. The method of claim 18, wherein the coating composition contains paradium catalyst.

20. The method of claim 17, wherein the hard coated film comprises substantially two layers including an intermediate layer coating a top surface of the synthetic resin molded body and an outermost layer coating a top surface fo the intermediate layer and the hard coated film obtained by said coating and said heat treating has a thickness of 10 μm or more and below 200 μm.

21. The method of claim 20, wherein the intermediate layer has a thickness of 1 μm or more and below 50 μm.

22. The method of claim 20, wherein the coating composition used to form the outermost layer in said coating contains paradium catalyst.

23. A method for producing an aircraft cabin window of synthetic resin having a hard coated film, comprising:

coating a coating composition containing inorganic perhydropolysilazane or its intermolecular dehydrogenation condensation polymer, which is substantially soluble in organic solvent that has no reactivity with SiH group or SiN group, and paradium catalyst mixed there into on the surface of a synthetic resin molded body;

heat treating the synthetic resin molded body at approximately ambient temperature to 100° C. in air or humidified air to obtain a hard coated film of one layer having siloxane bonds and/or silazane bonds;

facing the surface of the synthetic resin molded body having the hard coated film thereon outward as an outside surface of the aircraft and facing another surface of the synthetic resin molded body having no hard coated film toward a surface of an inner synthetic resin molded body having no hard coated film; and forming an at least double-pane construction including the synthetic resin molded body and the inner synthetic resin molded body with a hollow interspace there between.

24. A method for producing an aircraft cabin window of synthetic resin having a hard coated film, comprising:

coating a coating composition containing inorganic perhydropolysilazane or its intermolecular dehydrogenation condensation polymer, which is substantially soluble in organic solvent that has no reactivity with SiH group or SiN group, on the surface of a synthetic resin molded body;

heat treating the synthetic resin molded body at approximately ambient temperature to 100° C. in air or humidified air to obtain a hard coated film having siloxane bonds and/or silazane bonds;

facing the surface of the synthetic resin molded body having the hard coated film thereon outward as an outside surface of the aircraft and facing another surface of the synthetic resin molded body having no hard coated film toward a surface of an inner synthetic resin molded body having no hard coated film; and forming an at least double-pane construction including the synthetic resin molded body and the inner synthetic resin molded body with a hollow interspace there between;

wherein the hard coated film comprises two layers including an outermost layer and the coating composition for the outermost layer is mixed with paradium catalyst.

* * * * *